Dec. 22, 1970 G. BATE 3,550,154

HIGH DENSITY MAGNETIC TRANSFER

Filed Jan. 15, 1968

INVENTOR
GEOFFREY BATE

BY *Donald W. Margolis*
ATTORNEY

United States Patent Office 3,550,154

Patented Dec. 22, 1970

3,550,154

HIGH DENSITY MAGNETIC TRANSFER

Geoffrey Bate, Boulder, Colo., assignor to International Business Machines Corporation, Armonk, N.Y., a corporation of New York Filed Jan. 15, 1968, Ser. No. 697,655
Int. Cl. G11b *5/86;* G01d *15/12*
U.S. Cl. 346—74 9 Claims

ABSTRACT OF THE DISCLOSURE

A system for producing high density magnetic records by selectively transferring a portion of a data track from a record media to a copy media. Selective transfer is obtained by utilizing a transfer transducer which propagates an idealizing field which is effective to transfer only a portion of the width of the data track to the copy media.

BACKGROUND OF THE INVENTION

Field of the invention

This invention relates to transfer of magnetic images from a magnetic record media to an unrecorded magnetic copy media. More specifically, it relates to a technique and apparatus for transferring a magnetic record track by means of an idealizing field which is effective to transfer less than the entire width of the track.

Description of the prior art

Digital or discrete recording is that method of recording which uses predetermined levels of magnetization in a magnetizable medium as an indication of a limited set of values. In an ordinary sense, the presence of one level of magnetization would indicate a mark or, perhaps, a binary "1"; while a different level would indicate a space or, perhaps, a binary "0." By utilizing coded combinations of marks and spaces, different characters are indicated. At the present time, digital or discrete recording is widely used as a method of storing information in various record media; such as tapes, drums, disks, strips, loops, and other forms, for use with electronic data processing equipment.

In the operation of such equipment, record media are searched for information as needed. Access time for recovering information from a given media, as well as the amount of information which may be stored in a particular form of media are very important in determining the value of a specific form of information storage. Present objectives have been to increase the storage density of magnetic media to reduce the cost per bit of storage location by storing more information in a given area and, also, to effect a reduction in access time for given datum. Reduction of time for operation of a particular routine, in the economics of computer operation, is also a savings in costs.

Storage of information in a magnetic media may be accomplished by positioning a magnetic transducer closely adjacent to the surface of the media and then imparting relative movement between the transducer and the media. The transducer leaves magnetic impressions in the media according to electronically controlled variations of magnetic flux. The amount of information which may be recorded upon a given surface area in this manner is dependent upon the length of the bits of information and the width of the tracks in which the bits are recorded. If the track width or bit length can be materially reduced, then the bit density may be correspondingly increased to thereby increase the total amount of information which may be recorded in a given area. Track width is also dependent upon the magnetic flux pattern generated by the transducer. For the type of magnetic transducers most commonly in use, track widths are on the order of 10 to 40 mils wide.

It has been noted that as a transducer moves over a media surface, it will generally record in a track which has a definite width. Prior art efforts have been made to produce narrow tracks. These have required the fabrication of special transducer heads or have required sophisticated writing schemes. One such technique requires the positioning of a transducer to record information on a particular track, and then, at a subsequent time, repositioning the transducer partially over the recorded track and erasing the track except for a narrow region. These and other prior art efforts to produce narrow tracks have required complex or special systems and components.

The present invention utilizes standard recording components in combination with magnetic transfer techniques and apparatus to produce narrow tracks. Magnetic transfer means are well known and generally serve to create a duplicate magnetic record which is capable of conveying the same information as the original record. Magnetic transfer normally entails bringing a magnetic record media into magneto-coupled relation with an unrecorded copy media and causing the data on the original record media to be non-destructively transferred to the copy media. Transfer may be induced by the inherent magnetism of the original record media, or it may be induced and enhanced by an external idealizing field. Generally, in the absence of relative motion between the record media and the copy media, the areal density of the copy is the same as that of the original.

Therefore, it is an object of the present invention to provide improved apparatus for producing data in tracks having a narrow width.

Another object of this invention is to provide apparatus for increasing record density by reducing track width.

A further object of this invention is to provide apparatus for high density writing by selectively transferring data from a record media in such a manner that the record density on the copy media may be increased.

SUMMARY OF THE INVENTION

The instant invention provides narrow track, high density recording by transferring a data track from a record media to a copy media selectively, so that only a portion of the width of the track is transferred. Moreover, it does so without altering the quality of the original recording. The manner in which the subject invention achieves this is extremely simple, involving the use of a transfer transducer which creates an idealizing field which selectively transfers a portion of the width of the original track from the record media to the copy media. The distribution of magnetization produced in the copy member corresponds to the information carried by the original recording, but its lateral track width is reduced, thereby making possible an increase in lateral track density in the copy media.

It will, thus, be seen that the system taught herein provides a means of non-destructively duplicating a low density magnetic recording in a high density form by transferring it to a copy media with a reduced track width.

BRIEF DESCRIPTION OF THE DRAWING

The foregoing and other objects, advantages and features of the invention will be apparent from the following more particular description of preferred embodiments of the invention as illustrated in the accompanying drawings, in which.

DESCRIPTION OF THE PREFERRED EMBODIMENTS

Figure 1:
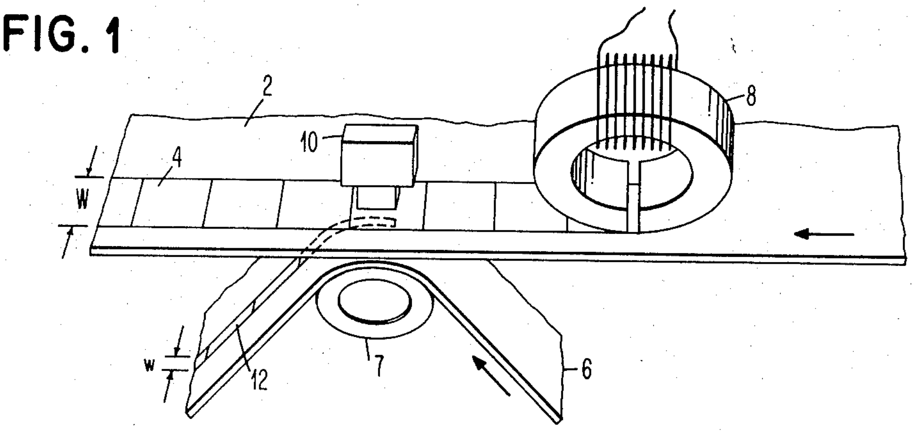
FIG. 1 is a perspective fragmentary view of a schematic conceptual showing the relative relationship of an ordinary writing transducer, a magnetic record media, a magnetic copy media and a transfer transducer.

The inventive system provides tracks of narrow width in a magnetic record by utilization of a new technique of magnetic transfer. The technique and the means required to practice it may be understood by referring to FIG. 1. A magnetic record media 2 including a record track 4 of width W is guided into magneto-coupled relation with an unrecorded copy media 6 by guide roll 7. Track 4 may be either a pre-existing record or one which has been freshly produced such as by conventional ring-type magnetic transducer 8. Transfer transducer 10 is present at the area where record media 2 is in magneto-coupled relation with copy record 6. Transfer transducer 10 is effective to propagate a narrow idealizing field through a selected portion of track 4. This effective field, having a width less than width W of track 4, is thus effective to transfer only a fraction of the width of track 4 to copy media 6. This results in the formation of a transfer track 12 on copy media 6, track 12 having a width *w* which is less than width W of track 4. It is of interest to note that if transfer transducer 10 were on the copy media side of this system and positioned to effect the same relative portions of media 2 and 6, the same transfer effect would be achieved.

If track 4 has a width W of 40 mils and transfer transducer has an effective width of 100 microinches (0.1 mil) transferred track 12 will have a width *w* on the order of 0.1 mil or 1/400 the width of original track 4. Assuming that a similar degree of reduction can be realized in the intertrack space between tracks, in copy media 12, record density can be increased 400 times over that of the original record.

Figure 2:
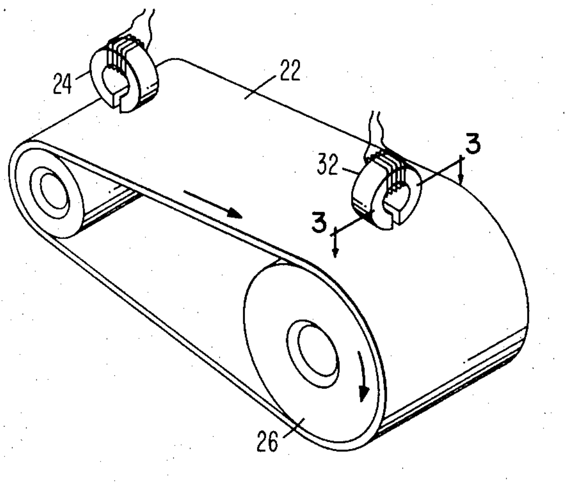
FIG. 2 is a perspective view shown, schematically, of a simple embodiment of the invention in which tracks of information are selectively transferred from a tape-loop media to a drum-copy media.
Figure 3:
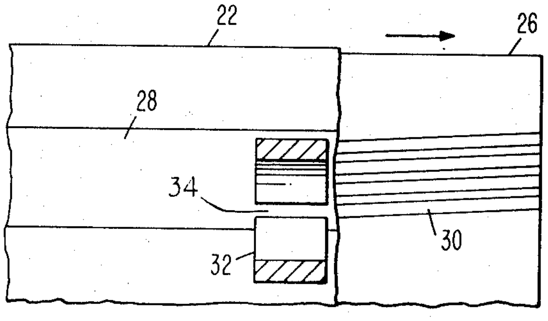
FIG. 3 is a plan fragmentary view of the device of FIG. 2, partially in section and taken along lines 3—3 of FIG. 2, schematically showing the selective transfer of data from a record media to a copy media.

Referring to FIGS. 2 and 3, an embodiment is shown by which high-density record information is transferred to a permanent magnetic storage device by employing the present invention. Information is first conventionally recorded on temporary magnetic storage loop 22 by conventional transducer 24 and then transferred to drum 26 for permanent high-density storage. Transfer occurs when the two magnetic surfaces are placed in magneto-coupled relation and a narrow idealizing field, such as a magnetic transfer field, is applied across the two media. This transfers a portion of track 28 from loop 22 to drum 26 in the form of narrow track 30.

In this form the apparatus includes a conventional magnetic record head 24, a magnetic record media in the form of a flexible loop 22, a high-density storage drum 26, and a transfer head 32. In one mode of operation, information is first recorded in loop 22 by conventional recording head 24. The recording track 28 thus formed is of normal width in this loop and may be, for example, approximately 40 mils wide. Transfer head 32 may also be a conventional recording head positioned normal to the surface of both loop 22 and drum 26, in the area of their mutual contact, with the length of gap 34 of head 32 substantially parallel to track 28. Gap 34 is of narrow width, for example, approximately 0.1 mil. This dimension of the gap controls the width of the transfer field and thus limits the regions of track 28 which are subjected to a transfer magnetic field. This, therefore, results in transfer to drum 26 of a track 30 on the order of 0.1 mil wide.

In the embodiment shown, loop 22 moves at the same relative velocity as drum 26. Under these conditions there is no friction between loop 22 and drum 26, and length of the transferred bits remains unchanged. If a speed differential were caused to exist between loop 22 and drum 26, as taught in U.S. Pat. 3,315,242, assigned to the assignee of the present application, bit modulation would also occur during transfer, causing the bits to be increased or decreased in length, depending on the relative velocity between the record media and the copy media. It is clear that incorporation of bit modulation with the present invention will result in two-dimensional modulation of data, and may be used to increase information density to an even greater degree.

During the contemplated transfer process heads 24 and 32 are indexed and drum 26 is rotated in such a manner that the transferred information is written in a helical pattern around the surface of the drum. Under the specific conditions recited, each track of transferred information has a width of only about 0.1 mil. This enables considerably more information to be recorded on the drum than if conventional recording techniques were used.

In practical computer usage the systems shown in FIGS. 2 and 3 would require multiple bits for each character of information written and would thus require simultaneous transfer of multiple tracks. This would require the use of multiple transfer heads to transfer the total character grouping to the copy media. Such multi-track transfer results in large, unrecorded inter-track areas between the transferred track. Full use of the these areas may be made in a loop-to-drum system as described. The succeeding helical tracks from each point of transfer would proceed to fill the inter-track gaps. When the entire gap is filled with data, the system can be completely indexed the width of a character. On readout, proper groupings of tracks which represent a character could be selected in order to obtain information.

Readout of the information stored on the drum may be performed by magneto-optic means. If drum 26 consists of a glass substrate coated with a ferro-magnetic layer, magneto-optic readout may be achieved from inside of the drum. If the substrate of drum 26 is not transparent, then magneto-optic readout may be achieved from outside the drum by application of the Kerr effect.

Another manner of obtaining readout would be to expand the data in accordance with the teaching of copending application Ser. No. 697,656 filed Jan. 15, 1968, substantially simultaneously with this application, and assigned to the same assignee as the present application.

It is understood that any transfer transducer capable of producing a narrow, discrete idealizing field may be utilized to effect the transfer necessary for the implementation of this invention. One alternative form of transfer transducer, not shown, is a single lamination of magnetic materials, such as is used in large numbers to form a conventional magnetic transducer. Such laminations have a thickness on the order of 0.1 to 1 mil. In the use of a lamination as a transfer transducer, the lamination is oriented in the conventional manner for a transducer with respect to the track that is similar to the orientations of head 8 in FIG. 1 and head 24 in FIG. 2. This results in the creation of a narrow, idealizing field which effectively transfers a portion of a track equal in width to the width of the lamination.

As still a further alternative, a probe magnetic head with a sharply defined narrow tip area would provide a suitable narrow idealizing field for transferring a portion of a track from a record media to a copy media.

In the instant invention the term "magneto-coupled" is intended to indicate the relationship of a record media to a copy media in which the media are in close enough contact or juxtaposition to allow transfer by the use of an idealizing field. In the past this term has been used to indicate a relationship between the media such that switching may occur without the presence of an idealizing field.

It will be appreciated by those skilled in the art that adaptation and implementation of the present invention for transfer between any forms of record media can be achieved by following the teaching of the present invention. It will be further recognized that wide application of the instant invention may be made in magnetic transducing and transfer systems. Any application of this invention would necessarily include abutting a magnetic copy media in magneto-coupled relation to a record media at a transfer station and then utilizing a transfer transducer for impressing an idealizing field through a selected portion of a track recorded in the record media.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a system for transferring magnetic data from a magnetic record media to a magnetic copy media so that the width of the transferred track pattern on the copy media is less than the width of the track pattern on the record media, including in combination:

a transfer station;

a magnetic record media present at said transfer station and including magnetic data in the form of a track pattern of given width;

an unrecorded magnetic copy media present at said transfer station and in magneto-coupled relation with said record media; and means to propagate a continuous idealizing field of lesser width than the width of the track pattern of the record media through said media at said transfer station.

2. The system of claim 1 wherein means are included for imparting motion to the record media and the copy media to move both said media through said transfer station.

3. The system of claim 2 wherein the means for imparting motion to the media functions to move both said media through the transfer station at the same relative speed.

4. The system of claim 2 wherein the means for imparting motion to the media functions to move said record media at a relative speed differential with respect to said copy media as both media pass through said transfer station.

5. The system of claim 2 wherein the record media is in the form of a flexible web and the copy media is in the form of an endless rotatable band, and wherein means are provided to index said means to propagate an idealizing field, and to cause said band to rotate, whereby the transferred track takes the form of a helix around said band.

6. The system of claim 1 wherein the means to propagate an idealizing field produces a magnetic flux.

7. The system of claim 6 wherein the means to propagate an idealizing field is a magnetic transducer, including a pair of magnetic poles terminating inpole faces with a non-magnetic gap therebetween, said transducer being so positioned that the pole faces are substantially parallel to the longitudinal dimension of said track.

8. In a system for transferring magnetic data from a magnetic record media including magnetic data in the form of a track pattern of given width to a magnetic copy media so that the width of the transferred track pattern on the copy media is less than the width of the track pattern on the record media, including in combination:

a transfer station;

means to bring said magnetic record media and said magnetic copy media into magneto-coupled relation at said transfer station; and means to propagate a continuous idealizing field of lesser width than the width of the track pattern of the record media through the magneto-coupled media at said transfer station.

9. The method of transferring magnetic data from a magnetic record media including magnetic data in the form of a track pattern of given width to a magnetic copy media so that the width of the transferred track pattern on the copy media is less than the width of the track pattern on the record media, comprising: bringing said magnetic record media and said magnetic copy media into magneto-coupled relation; and then propagating an idealizing field of lesser width than the width of the track pattern of the record media through said media while they are in magneto-coupled relation.

References Cited

UNITED STATES PATENTS

| | | | |
|---|---|---|---|
| 3,277,244 | 10/1966 | Frost | 179—100.2 |
| 3,341,854 | 9/1967 | Supernowicz | 346—74 |
| 3,439,918 | 4/1969 | Walter | 274—4 |

BERNARD KONICK, Primary Examiner

G. M. HOFFMAN, Assistant Examiner

U.S. Cl. X.R.

179—100.2; 340—174.1